United States Patent
Portmann et al.

(10) Patent No.: US 8,128,247 B2
(45) Date of Patent: Mar. 6, 2012

(54) ILLUMINATION DEVICE FOR FLASH PHOTOGRAPHY

(75) Inventors: Francois Portmann, Frankreich (DE); Marcel Griessman, Frankreich (DE)

(73) Assignee: Bron Elektronik AG, Schweiz (CH)

(*) Notice: Subject to any disclaimer, the term of this patent is extended or adjusted under 35 U.S.C. 154(b) by 112 days.

(21) Appl. No.: 12/669,210

(22) PCT Filed: Jul. 17, 2008

(86) PCT No.: PCT/EP2008/059414
§ 371 (c)(1),
(2), (4) Date: Jun. 8, 2010

(87) PCT Pub. No.: WO2009/010571
PCT Pub. Date: Jan. 22, 2009

(65) Prior Publication Data
US 2010/0265690 A1    Oct. 21, 2010

(30) Foreign Application Priority Data
Jul. 18, 2007 (DE) .......... 10 2007 033 455

(51) Int. Cl.
*G03B 15/02* (2006.01)
(52) U.S. Cl. ............. 362/11; 362/16; 362/18; 362/545; 362/547; 362/293
(58) Field of Classification Search ............... 362/3, 6, 362/11, 16, 18, 293, 373, 545, 547
See application file for complete search history.

(56) References Cited

U.S. PATENT DOCUMENTS

| 2,979,601 | A  |   | 4/1961 | McClees   |           |
|-----------|----|---|--------|-----------|-----------|
| 3,397,612 | A  |   | 8/1968 | Ludloff   |           |
| 5,093,769 | A  | * | 3/1992 | Luntsford | 362/269   |
| 5,199,785 | A  | * | 4/1993 | Scholz    | 362/296.03|
| 6,022,124 | A  | * | 2/2000 | Bourn et al. | 362/247 |
| 6,853,309 | B1 | * | 2/2005 | Schroter  | 340/870.02|

FOREIGN PATENT DOCUMENTS
DE     1225041     9/1966
(Continued)

OTHER PUBLICATIONS
International Preliminary Report on Patentability for PCT/EP2008/002597, dated Feb. 9, 2010, 9 pages.
(Continued)

*Primary Examiner* — Ali Alavi
(74) *Attorney, Agent, or Firm* — Michael Best & Friedrich LLP (57) ABSTRACT

The invention relates to an illumination device for flashlight photography comprising at least one reflector chamber which, in use, can be arranged in the direction of an object being photographed, having at least one reflector and at least one flash element arranged in the reflector chamber as first light source, as well as at least one UV filter element which, in use, covers the reflector chamber on a radially extending outer face in the direction of the object being photographed, the filter element having at least one ventilation opening. By means of the arrangement, an illumination device suitable for all fields of application is to be provided, a particular objective being to generate flash series of any desired length and at the same time to provide optimum UV protection on the illumination device. Uses of such an illumination device are also defined.

19 Claims, 3 Drawing Sheets

FOREIGN PATENT DOCUMENTS

| | | |
|---|---|---|
| DE | 4006009 A1 | 8/1990 |
| DE | 102005034436 A1 | 1/2007 |
| EP | 1677143 A1 | 7/2006 |
| GB | 726926 A | 2/1955 |
| GB | 878640 A | 4/1961 |

OTHER PUBLICATIONS

International Search Report for PCT/EP2008/059414, dated Oct. 8, 2008, 2 pages.

* cited by examiner

ILLUMINATION DEVICE FOR FLASH PHOTOGRAPHY

RELATED APPLICATIONS DATA

This is a national phase application under 35 U.S.C. §371 of International Patent Application No. PCT/EP2008/059414, filed on Jul. 17, 2008, which claims priority from German Patent Application No. DE102007033455.0, filed on Jul. 18, 2007, the entire contents of which are both incorporated by reference herein.

BACKGROUND

The invention relates to an illumination device for flashlight photography and to uses of such an illumination device.

Conventional devices for providing light for flashlight photography are especially provided for flash series of high output. When a flash is generated, a large amount of electrical energy is converted into heat, so that when the flash is repeated the temperature in the illumination device, especially in the reflector chamber, rises rapidly. Since, in use, the reflector chamber is usually covered in the direction of an object being photographed by means of a protective glass, that heat can be dissipated only to a poor degree. In that respect, in the case of conventional flash lamps only a limited number of flashes can be produced. The protective glass serves especially as UV protection, but prevents additional light sources, such as, for example, the modelling light required for preparing for the photograph, from being used.

Flashlight series having a high flash density, that is to say a large number of flashes which can be produced in a series, and the use of modelling light are particularly important, however, for high image quality in the fields of fashion, sport and events.

SUMMARY

In order then to counteract those disadvantages, a grid is used instead of the protective glass for covering the reflector chamber. The grid enables heat to escape from the reflector chamber. In addition, in arrangements of this kind it is possible to use the required modelling light. In this case, however, it is difficult to provide a suitable UV protective measure on the arrangement.

The problem of the invention is to define an illumination device for flashlight photography by means of which an arrangement suitable for all fields of application is provided, a particular objective being to generate flash series of any desired length and at the same time to provide optimum UV protection on the illumination device.

In particular, the problem is solved by an illumination device for flashlight photography comprising at least one reflector chamber which, in use, can be arranged in the direction of an object being photographed, having at least one reflector and at least one flash element arranged in the reflector chamber as first light source, as well as at least one UV filter element which, in use, covers the reflector chamber on a radially extending outer face in the direction of the object being photographed, the filter element having at least one ventilation opening, i.e. being constructed in such a way that a ventilation opening is provided.

An important aspect of the invention is that, by means of the filter element, at least the object being photographed is now sufficiently protected from UV radiation and also the heat produced during the flash can simultaneously be dissipated, especially from the reflector chamber, through the ventilation opening and so the light sources can be cooled. The number of flashes that can be produced in a flash series can be increased and the object can be brought closer to the lamp than in the case of conventional arrangements.

In one embodiment, the reflector chamber is of ring-shaped construction and the flash element is arranged distributed around the circumference (of the ring-shaped reflector chamber). That is to say, the illumination device is preferably of ring-shaped construction and allows the flash element to be arranged distributed around the circumference. It is thus possible to utilise a high light yield concentrated onto a defined space. The ring-shaped construction allows a centred light source to be provided, which for that purpose is suitably mounted on a photographic apparatus. Details relating to the use of ring-shaped illumination devices are described further hereinbelow.

If the lamp arrangement and thus also the reflector chamber is of ring-shaped construction, the flash element can preferably also be of ring-shaped construction. The flash element therefore comprises at least one ring-shaped flash tube which is mounted or mountable in the ring-shaped reflector chamber either in fixed position or so as to be variably adjustable. Usually the tube is installed fixedly in the reflector. The two output terminals for supplying the flash energy are then led, for example, insulated, through the reflector. A third terminal preferably conducts the ignition voltage to the ignition wire of the flash tube.

In the reflector chamber there is(are) preferably provided as second light source at least one, especially at least three, point light source(s) arranged uniformly distributed around the circumference, the point light source(s) serving as modelling light. The modelling light, being a continuous light source, is necessary inter alia for correctly aligning, for example, the illumination device and thus the flash element. With the device according to the invention it is now possible to use modelling light. For that purpose, the modelling light is preferably arranged in the immediate vicinity of the ventilation opening, so that the heat can easily be dissipated and the light sources cooled. In particular, the opening allows a high output of modelling light, because the modelling light is not provided with a covering. The modelling light is therefore not adversely affected by the filter element, that is to say the filter action does not take place in respect of the modelling light. The modelling light can thus be used without restriction.

Preferably, each of the point light sources is arranged in front of a respective ventilation opening or the ventilation opening, or the ventilation opening(s) is(are) constructed and arranged in such a way that they are located in front of the modelling light point light sources. The opening(s) is(are) so defined that minimum safety dimensions are observed. Safety dimensions are safety distances, that is to say maximum dimensions which may not be fallen below (or where applicable not exceeded) in order that contact cannot be made with hot or electrically charged parts. For example, one safety dimension to be observed is the greatest possible width of the ventilation opening or the openings.

A development according to the invention provides that a ventilation means, especially a fan, is provided by means of which the reflector chamber can be subjected to forced ventilation, the air blown into the reflector chamber by the ventilation means being able to escape to the outside through the ventilation opening provided in the filter element. The device used for the forced ventilation is preferably arranged in such a way that the heated air is pushed out of the reflector chamber through the ventilation opening and the heat is thus dissipated from the arrangement.

Preferably, the reflector chamber comprises a main reflector and a lateral reflector, the lateral reflector defining an axially extending outer side wall of the reflector chamber.

In one embodiment, the lateral reflector and the filter element are of one-piece construction, the main reflector and the lateral reflector advantageously then being provided separately from one another. Alternatively, the filter element can also be provided separately from the lateral reflector. That is to say, both elements can, if necessary, be used separately from one another. With the ring-shaped arrangement, the filter element is preferably likewise of ring-shaped construction and partially covers the reflector chamber accordingly.

One embodiment provides that the filter element is in the form of UV protective glass. The protective glass behaves optically, for example like a diffuser for certain light wavelengths. Shorter wavelengths can thus be blocked, for example. The protective glass preferably has no effect on the angle of illumination. It protects especially the object being photographed from UV radiation.

If the lateral reflector and the filter element, that is to say, for example, the protective glass, are fixedly joined to one another, the protective glass is preferably received in a region of the lateral reflector that is, for example, correspondingly shaped. The join is formed preferably by crimping-over, so that the protective glass is seated fixedly in the deformed or shaped region of the lateral reflector. That is to say, in the region of the join (the join to the protective glass) the lateral reflector is shaped around the protective glass in such a way that a fixed, preferably non-disassemblable join is obtained. This is a very economic joining method and has the result that the protective glass together with the lateral reflector forms an exchangeable, non-disassemblable structural assembly.

In a further embodiment there is associated with the reflector chamber an electronics chamber which serves to receive a control circuit for the illumination device. The electronics chamber is arranged, for example, immediately adjacent (that is to say advantageously, for example, "behind") the reflector chamber in order to keep the overall size of the lamp arrangement small. By means of the fan, the air is preferably drawn from the electronics chamber, pushed into the reflector chamber and conducted to the open air by way of the ventilation opening to dissipate the heat.

Advantageously, the ventilation opening provided in the filter element is in the form of a continuous annular opening which preferably bounds the filter element radially inwardly.

The opening is therefore arranged on the inner circumference of the ring (or is arranged in such a way that a ring is formed) and the reflector chamber is thus only partially covered. Immediately behind the annular opening there are then arranged, for example, the point light sources, that is to say the modelling light. That arrangement is simple to produce. In addition, the individual components, especially the filter element, are constructed so as to be easy to manipulate (especially in respect of the lateral reflector which is formed in one piece or is separately arranged).

Alternatively or in addition, it is possible to define the ventilation opening provided in the filter element by a plurality of individual openings preferably arranged uniformly distributed around the circumference. The filter element, that is to say the UV protective glass, accordingly has individual openings which form the ventilation opening. There is thus virtually no possibility of access to the reflector chamber. In addition, the construction is mechanically more stable.

In an advantageous embodiment, the main reflector is formed by the inner side of a ring-shaped L-profile, which inner side is provided with a reflecting layer. The L-profile thus lines the walls of the reflector chamber, especially the axially extending inner side wall and the radially extending rear wall thereof. The lateral reflector is also provided with the reflecting layer.

The lateral reflector (for the axially extending outer side wall) and the filter element for the face (radially extending outer face) located opposite the radially extending rear wall surround the remaining region of the reflector chamber. It is also possible for the filter element to comprise a ring-shaped L-profile made of UV protective glass which is arranged on the main reflector in such a way that the inner sides of the main reflector and the filter element face one another. That is to say, the axially extending outer side wall is also formed by the protective glass or is arranged thereon, so that the filter element ultimately extends into the region of the side wall. The L-profiles joined to one another then together encompass the reflector chamber, forming the above-described ventilation opening.

The electronics chamber is arranged on the rear side of the radially outwardly extending limb of the ring-shaped L-profile of the main reflector, especially inside an electronics housing extending in the shape of a ring. The electronics can thus be housed in a secure and protected way, the arrangement of the electronics chamber directly at the reflector chamber resulting in a space-saving device.

Preferably, when the filter element is in the form of a ring-shaped L-profile made of UV protective glass, the axially or alternatively also radially extending limb can be covered by a light-impermeable strip or annular disc. This allows the additional possibility of providing reliable UV protection.

Also defined are uses of an illumination device for flashlight photography.

Preferably, the described device is used for a camera or an umbrella reflector, wherein the illumination device in the former case is preferably a lens and in the latter case can be arranged extending around an umbrella shaft.

For use with the umbrella reflector it is advantageous to remove the lateral reflector and to utilise the umbrella reflector. For that purpose, for example, the L-shaped filter element profile is provided. As a result of those preferred uses it is possible for various photographic instruments to be operated with the illumination device in a simple way with better illumination than hitherto.

BRIEF DESCRIPTION OF THE DRAWINGS

The invention will be described below on the basis of exemplary embodiments which will be explained in detail with reference to the Figures, wherein.

DETAILED DESCRIPTION

In the description hereinbelow, parts that are the same or have the same action have been given the same reference numerals.

Figure 1:
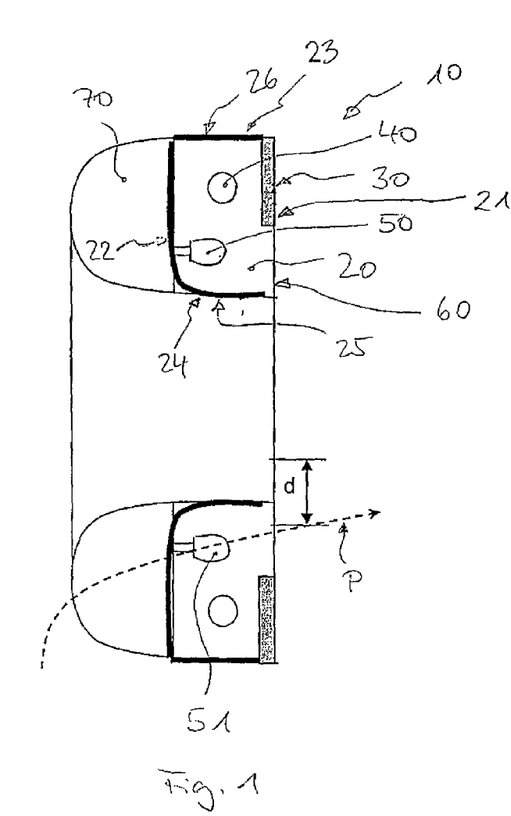
FIG. 1 is a simplified sectional view of an embodiment of the illumination device according to the invention.

FIG. 1 shows the basic structure of an illumination device 10 according to the invention in a first embodiment. The illumination device 10 is intended for flashlight photography and is of ring-shaped construction. A simplified sectional view is shown, that is to say the ring has been cut open, but the cut faces are not correspondingly indicated by hatched regions.

The ring-shaped illumination device 10 is a flash-generating device (ring flash) and has a reflector chamber 20, which is likewise ring-shaped and which is arranged on the ring flash in such a way that it can be aligned in the direction of an object being photographed.

In the reflector chamber 20 there is arranged a flash element 40, in this case a ring-shaped flash tube, as first light source. The flash element is mounted or mountable in fixed position or so as to be variably adjustable. Also provided are point light sources 50, 51, which act as modelling light. In this case two point light sources 50, 51 can be seen, it also being possible for only one light source to be provided. It is desirable to have a plurality of point light sources, which are then arranged uniformly distributed around the circumference, in order to obtain a uniform light yield. The modelling light serves, for example, as a continuous light source.

In this exemplary embodiment the reflector chamber 20 is lined with a main reflector 25 and a lateral reflector 26. Also provided is a filter element 30 which partially covers the reflector chamber 20 in the direction of an object being photographed (when the illumination device is in use), that is to say on a radially extending outer face. The main reflector 25 is in the form of an L-shaped profile, one limb of which extends over the axially extending inner side wall 24 and the other limb of which extends over the radially extending rear wall 22 of the chamber 20, the wall 22 being located opposite the radially extending outer face 21 covered by the filter element 30. The lateral reflector 26 is arranged on the axially extending outer side wall 23 of the illumination device 10. The reflectors 25, 26 provide for an increase in the light yield. In addition, glare in undesirable regions can be avoided. It is also possible for the reflectors themselves to form the walls in question. That is to say, therefore, that the walls in question are formed by the reflectors or the walls are provided with a reflector layer.

The illumination device is so arranged during operation that the reflector chamber faces the object to be illuminated. The side walls (envelope surfaces or envelope surface and inner surface of the hollow cylinder running parallel to the envelope surface) are to be understood as being axial walls, i.e. axially extending walls, and the walls (or faces; base face, top face of the hollow cylinder) lying in the plane of the ring as being radial walls, i.e. radially extending walls (or faces). The faces are accordingly arranged substantially at an angle of 90° to one another.

The filter element 30 in constructed in such a way that it only partially covers the reflector chamber 20 on the radially extending outer face 21 of the reflector chamber and is radially inwardly limited. There is thus provided a ventilation opening 60 for the illumination device 10 which is the form of an annular opening.

Because heat is produced during the generation of flashes, that heat can be dissipated in the direction of arrow P by way of the ventilation opening 60. The point light sources 50, 51 of the modelling light are arranged in front of the ventilation opening 60 and are thus not covered by the filter element 30. The opening is otherwise so defined that minimum safety dimensions d are observed.

By virtue of the ventilation opening it is possible to generate a large number of flashes in a series, because the heat produced can easily be dissipated and the light sources thus also cooled. Preferably, forced ventilation, for example a fan, can be provided (not shown herein) which pushes the generated heat out of the reflector chamber 20 in the direction of arrow P.

The filter element 30 is here provided in the form of UV protective glass and allows optimum protection of the object being photographed from UV radiation.

Immediately adjoining the radially extending rear wall 22 of the reflector chamber 20 there is arranged an electronics chamber 70 which is provided to receive a control circuit for the illumination device 10. The fan then draws the air from the rear electronics chamber 70, for example, and pushes it into the reflector chamber 20. The ventilation opening 60 allows the heated air to be removed.

Figures 2, 3:
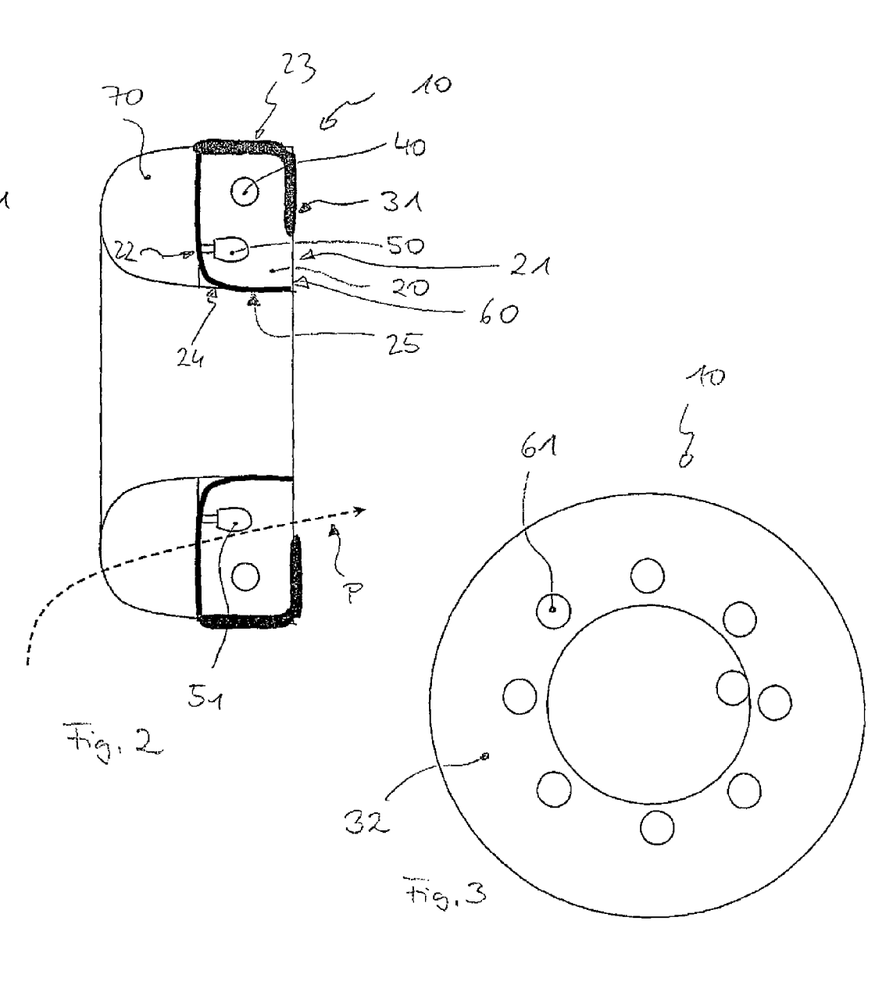
FIG. 2 is a simplified sectional view of a further embodiment of the device according to the invention.
FIG. 3 shows a further embodiment of the device according to the invention viewed in the direction towards the reflector chamber.

FIG. 2 shows a further embodiment of the device 10 according to the invention. Here too, a simplified sectional view is shown. This embodiment corresponds substantially to that shown in FIG. 1, but here the filter element 31 is differently constructed. The filter element 31 partially covers the reflector chamber 20 as described in FIG. 1, but additionally encompasses the axially extending outer side wall 23 of the reflector chamber 20, so that the reflector chamber 20 is surrounded by UV protective glass also at the side. The filter element 31 here (in principle with two limbs), like the main reflector, forms an L-profile, both L-profiles being arranged relative to one another in such a way that they encompass the reflector chamber 20.

In this case too, heated air can be dissipated from the illumination device 10 in the direction of arrow P.

The ring-shaped construction of the illumination device (ring flash) 10 makes it possible inter alia for the device to be mountable on the lens of a camera or to be arranged extending around the shaft of an umbrella reflector. In the embodiment according to FIG. 1, the filter element 30 and lateral reflector 26 can be, for example, of one-piece construction (see especially FIG. 4) or can be separable or separate from one another. In the latter case, the lateral reflector 26 is then fully removable, especially when used with the umbrella reflector, so that the light yield can be increased by means of the umbrella reflector.

FIG. 3 shows a further embodiment of the device 10 according to the invention viewed in the direction towards the reflector chamber. Here the ventilation opening 61, in the form of an annular opening, in the filter element 32 has been replaced by a plurality of openings distributed around the circumference. As a result, the point light sources are housed with greater protection. In addition, access to the reflector chamber is substantially prevented. In this embodiment, the ventilation openings 61 are distributed uniformly around the circumference. It is also possible, of course, to provide a different, non-uniform distribution in order to provide the greatest possible number of ventilation openings at the location(s) where the greatest increase in temperature in the reflector chamber is to be expected. The ventilation openings can likewise be of different sizes and/or shapes.

Figure 4:
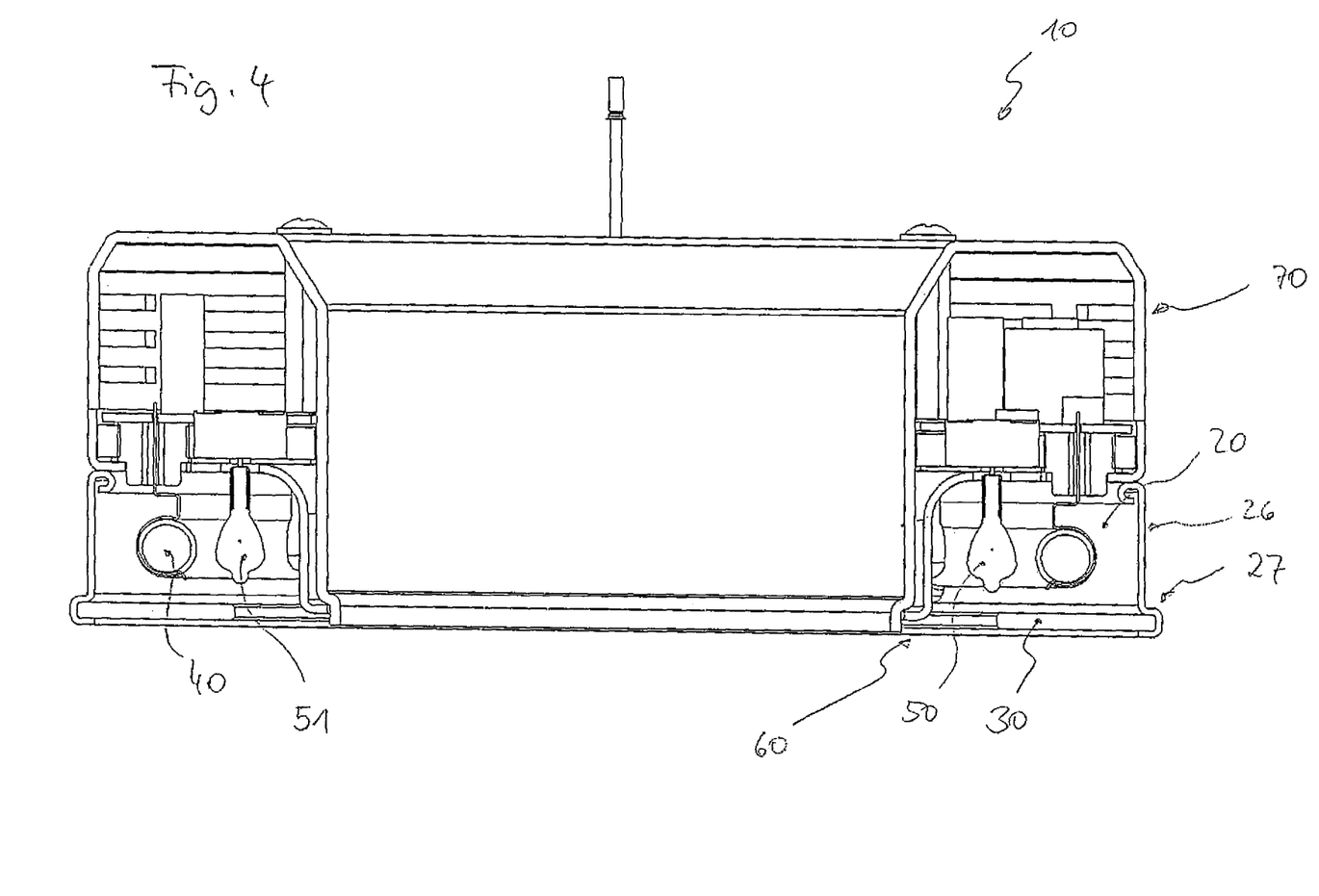
FIG. 4 is a cut-open view of a further embodiment of the device according to the invention.

FIG. 4 shows a further embodiment of the device 10 according to the invention in a cut-open view. This corresponds substantially to that shown in FIG. 1, but here the lateral reflector 26 and the protective glass 30 are fixedly joined to one another, so that they form a unit which can be exchanged only as a whole. In this embodiment, the protective glass 30 is fixed in the lateral reflector 26 by crimping-over, so that a non-disassemblable structural assembly is provided. That is to say, the lateral reflector 26 has an edge region 27 constructed in such a way that the protective glass can be received in that deformed edge region 27.

Figure 5:
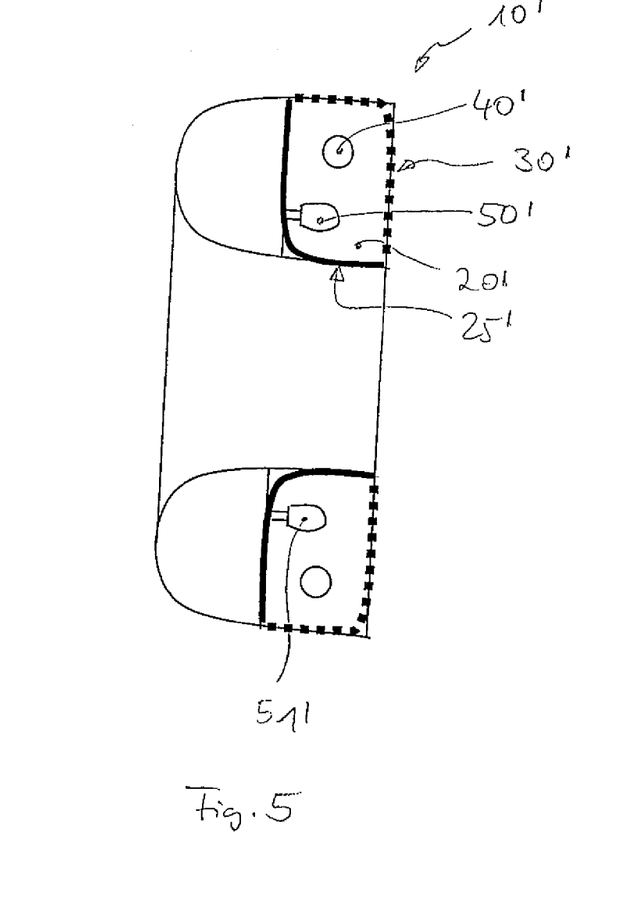
FIG. 5 shows the prior art.
Figure 6:
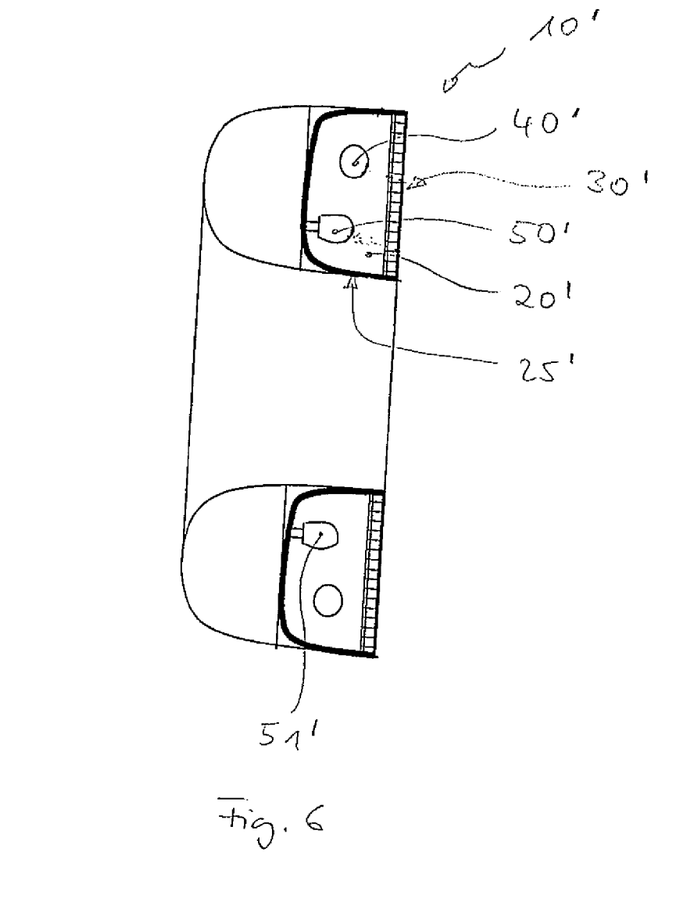
FIG. 6 is a further view of the prior art.

FIGS. 5 and 6 show conventional arrangements 10', as known from the prior art. These arrangements too are of ring-shaped construction and have a reflector chamber 20' with a flash tube 40' and point light sources 50', 51'.

For covering the reflector chamber 20', the arrangement 10' according to FIG. 5 shows a protective grid 30', which serves as access prevention but does not hold back UV radiation. The grid 30' covers the axially extending outer side wall of the reflector chamber 20' and therefore, like a main reflector 25', is in the form of a ring-shaped L-profile. The grid and the main reflector completely encompass the reflector chamber 20'.

As shown by FIG. 6, the reflector chamber 20' is here lined with a coating of reflecting material both on the radially extending rear wall and on the side walls, while the radially extending outer face located opposite the radially extending rear wall is covered by the grid 30'. Here too, insufficient UV protection is provided.

In order to implement UV protection also in conventional arrangements, the reflector chamber coverings are usually in the form of protective glass. Only filter elements providing a full covering, which do not allow dissipation of heat, have been known hitherto. Furthermore, it is not possible in those arrangements to provide point light sources, because the filter element would adversely affect the light yield.

With the illumination device according to the invention it is possible both to operate with modelling light and to provide sufficient UV protection. The ventilation opening(s) make(s) it possible, while utilising both advantages (use of modelling light, sufficient UV protection), to provide a device which can be used to obtain high image quality in all fields of application. The number of flashes that can be produced in a flash series can be increased and the object can be brought closer to the lamp than in the case of conventional arrangements.

List of Reference Numerals

10 illumination device
20 reflector chamber
21 radially extending outer face
22 radially extending rear wall
23 axially extending outer side wall
24 axially extending inner side wall
25 main reflector
26 lateral reflector
27 edge region
30 filter element
31 filter element
32 filter element
40 flash element, flash tube
50 point light source, modelling light
51 point light source, modelling light
60 ventilation opening
61 ventilation opening
70 electronics chamber
10' illumination device
20' reflector chamber
25' main reflector
30' protective grid
40' flash element, flash tube
50' point light source, modelling light
51' point light source, modelling light
P direction of arrow (air flow)
d safety distance

What is claimed is:

1. Illumination device for flashlight photography, comprising
    at least one reflector chamber (20) which, in use, can be arranged in the direction of an object being photographed, having at least one reflector (25),
    at least one flash element (40) arranged in the reflector chamber (20) as first light source,
    at least one UV filter element (30, 31, 32) which, in use, covers the reflector chamber (20) on a radially extending outer face (21) in the direction of the object being photographed,
        wherein the filter element (30, 31, 32) has at least one ventilation opening (60, 61).

2. Illumination device according to claim 1,
    wherein
    the reflector chamber (20) is of ring-shaped construction and the flash element (40) is arranged distributed around the circumference.

3. Illumination device according to claim 1,
    wherein
    the flash element (20) comprises at least one ring-shaped flash tube which is mounted or mountable in the ring-shaped reflector chamber (20) either in fixed position or so as to be variably adjustable.

4. Illumination device according to claim 1,
    wherein
    in the reflector chamber (20) there is provided as second light source at least one, preferably at least three, point light source(s) (50, 51) arranged uniformly distributed around the circumference, the point light source(s) (50, 51) serving as modelling light.

5. Illumination device according to claim 4,
    wherein
    each of the point light sources (50, 51) is arranged in front of a respective ventilation opening (60, 61).

6. Illumination device according to claim 1,
    wherein
    a ventilation means, especially a fan, is provided by means of which the reflector chamber (20) can be subjected to forced ventilation, the air blown into the reflector chamber (20) by the ventilation means being able to escape to the outside through the ventilation opening (60, 61) provided in the filter element (30, 31, 32).

7. Illumination device according to claim 1,
    wherein
    the reflector chamber (20) comprises a main reflector (25) and a lateral reflector (26), the lateral reflector (26) defining an axially extending outer side wall (23) of the reflector chamber (20).

8. Illumination device according to claim 7,
    wherein
    the lateral reflector (26) and the filter element (30, 32) are of one-piece construction.

9. Illumination device according to claim 7,
    wherein
    the filter element (30, 32) is separable from the lateral reflector (26).

10. Illumination device according to claim 1,
    wherein
    the filter element (30, 31, 32) is in the form of UV protective glass.

11. Illumination device according to claim 1,
    wherein
    there is associated with the reflector chamber (20) an electronics chamber (70) which serves to receive a control circuit for the illumination device (10).

12. Illumination device according to claim 1,
wherein
the ventilation opening (60) provided in the filter element (30, 31) is in the form of a continuous annular opening which preferably bounds the filter element (30, 31) radially inwardly.

13. Illumination device according to claim 1,
wherein
the ventilation opening provided in the filter element (32) is defined by a plurality of individual openings (61) preferably arranged uniformly distributed around the circumference.

14. Illumination device according to claim 7,
wherein
the main reflector (25) is formed by the inner side of a ring-shaped L-profile, which inner side is provided with a reflecting layer.

15. Illumination device according to claim 14,
wherein
the filter element (31, 32) comprises a ring-shaped L-profile made of UV protective glass which is arranged on the main reflector (25) in such a way that the inner sides of the main reflector (25) and the filter element (31, 32) face one another.

16. Illumination device according to claim 11,
wherein
the electronics chamber (70) is arranged on the rear side of the radially outwardly extending limb of the ring-shaped L-profile of the main reflector (25), especially inside an electronics housing extending in the shape of a ring.

17. Illumination device according to claim 1,
wherein
when the filter element (31, 32) is in the form of a ring-shaped L-profile made of UV protective glass, the axially or alternatively also radially extending limb can be covered by a light-impermeable strip or annular disc.

18. The illumination device of claim 1, wherein the illumination device is a lens for a camera.

19. The illumination device of claim 1, wherein the illumination device extends around an umbrella shaft.

* * * * *

UNITED STATES PATENT AND TRADEMARK OFFICE
CERTIFICATE OF CORRECTION

| | | |
|---|---|---|
| PATENT NO. | : 8,128,247 B2 | Page 1 of 1 |
| APPLICATION NO. | : 12/669210 | |
| DATED | : March 6, 2012 | |
| INVENTOR(S) | : Francois Portmann et al. | |

It is certified that error appears in the above-identified patent and that said Letters Patent is hereby corrected as shown below:

On the cover page, under (75) Inventors, "Griessman" should be --Griessmann--.

Signed and Sealed this
Thirteenth Day of November, 2012

David J. Kappos
*Director of the United States Patent and Trademark Office*